US006617379B2

(12) United States Patent
Worku et al.

(10) Patent No.: US 6,617,379 B2
(45) Date of Patent: Sep. 9, 2003

(54) FLAME RETARDANT POLYMER COMPOSITIONS

(75) Inventors: Anteneh Z. Worku, Baton Rouge, LA (US); Daniel A. De Schryver, Bonheiden (BE); Susan D. Landry, Baton Rouge, LA (US); Arthur G. Mack, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 10/005,653

(22) Filed: Dec. 4, 2001

(65) Prior Publication Data

US 2003/0109608 A1 Jun. 12, 2003

(51) Int. Cl.⁷ .................... C08K 5/34; C08K 5/3495
(52) U.S. Cl. ............... 524/100; 524/421; 524/424; 524/495
(58) Field of Search ................. 524/100, 421, 524/424, 494

(56) References Cited

U.S. PATENT DOCUMENTS

| | | | | |
|---|---|---|---|---|
| 3,955,028 A | | 5/1976 | Weil | 428/272 |
| 3,988,435 A | | 10/1976 | Humbert et al. | 424/54 |
| 3,997,505 A | | 12/1976 | Albright | 260/45.8 R |
| 3,998,789 A | | 12/1976 | Yoshioka | 260/47 P |
| 4,007,236 A | | 2/1977 | Duffy et al. | 260/927 R |
| 4,018,560 A | | 4/1977 | Golborn et al. | 8/190 |
| 4,034,141 A | | 7/1977 | Duffy et al. | 428/473 |
| 4,049,754 A | | 9/1977 | Weil | 260/952 |
| 4,053,450 A | | 10/1977 | Golborn et al. | 260/45.8 R |
| 4,134,877 A | | 1/1979 | Morgan et al. | 260/45.9 NP |
| 4,201,593 A | | 5/1980 | Sienkowski et al. | 106/18.14 |
| 4,201,677 A | | 5/1980 | Shukla et al. | 252/8.1 |
| 4,226,907 A | | 10/1980 | Seinkowski et al. | 428/288 |
| 4,298,518 A | | 11/1981 | Ohmura et al. | 260/32.6 NA |
| 4,345,002 A | | 8/1982 | Smith et al. | 428/288 |
| 4,360,616 A | | 11/1982 | Pagilagan | 524/100 |
| 4,365,033 A | | 12/1982 | Halpern et al. | 524/118 |
| 4,373,103 A | | 2/1983 | Jung et al. | 544/195 |
| 4,504,611 A | | 3/1985 | Ilardo et al. | 524/101 |
| RE32,472 E | | 8/1987 | Halpern | 524/100 |
| RE32,473 E | | 8/1987 | Mott | 524/118 |
| 4,699,824 A | | 10/1987 | Pufahl | 428/220 |
| 4,714,724 A | | 12/1987 | Jung et al. | 524/100 |
| 4,786,673 A | | 11/1988 | Morival et al. | 524/101 |
| 4,808,744 A | | 2/1989 | Hardy et al. | 558/163 |
| 4,883,891 A | | 11/1989 | Hardy et al. | 558/161 |
| 4,883,892 A | | 11/1989 | Hardy et al. | 558/164 |
| 5,097,057 A | * | 3/1992 | Hardy et al. | 558/163 |
| 5,334,692 A | | 8/1994 | Hess et al. | 528/126 |
| 5,369,157 A | | 11/1994 | Wirth | 524/100 |
| 5,973,041 A | * | 10/1999 | Campbell et al. | 524/117 |
| 6,031,032 A | | 2/2000 | Horacek et al. | 524/100 |
| 6,136,973 A | | 10/2000 | Suzuki et al. | 544/195 |
| 6,146,557 A | | 11/2000 | Inata et al. | 252/609 |
| 6,166,114 A | * | 12/2000 | Cosstick et al. | 524/100 |
| 6,191,276 B1 | * | 2/2001 | Cella | 544/337 |
| 6,204,313 B1 | * | 3/2001 | Bastiaens et al. | 524/100 |
| 6,221,939 B1 | * | 4/2001 | Campbell et al. | 524/117 |
| 6,225,383 B1 | | 5/2001 | Hirono et al. | 524/100 |
| 6,228,912 B1 | * | 5/2001 | Campbell et al. | 524/100 |
| 6,239,219 B1 | | 5/2001 | Breant et al. | 525/101 |
| 6,294,599 B1 | | 9/2001 | Inoue et al. | 524/100 |

FOREIGN PATENT DOCUMENTS

| | | |
|---|---|---|
| EP | 0571241 | 8/1997 |
| GB | 1429531 | 3/1976 |
| JP | 5419919 | 2/1979 |

OTHER PUBLICATIONS

Abstract of JP 619254, Jul. 1994, from espacenet database.
Abstract of JP 8067769, Mar. 1996, from espacenet database.
Abstract of JP 8183876, Jul. 1996, from espacenet database.
Abstract of JP 9208959, Aug. 1997, from espacenet database.
Abstract of JP 9221567, Aug. 1997, from espacenet database.
Abstract of JP 9235407, Sep. 1997, from espacenet database.
Abstract of JP 10175985, Jun. 1998, from espacenet database.
Abstract of JP 11147979, Jun. 1999, from espacenet database.
Abstract of JP 11147980, Jun. 1999, from espacenet database.
Abstract of JP 11181271, Jul. 1999, from espacenet database.
Abstract of JP 11185532, Jul. 1999, from espacenet database.
Abstract of JP 11199724, Jul. 1999, from espacenet database.
Abstract of JP 11209534, Aug. 1999, from espacenet database.

(List continued on next page.)

Primary Examiner—Kriellion A. Sanders
(74) Attorney, Agent, or Firm—Edgar E. Spielman, Jr.

(57) ABSTRACT

N,N'-piperazinebis(neopentylglycol)phosphoramidate is used in combination with at least one co-additive which is (i) melamine, (ii) one or more melamine compounds or derivatives, or (iii) both of (i) and (ii) to provide effective flame retardancy in thermoplastic polymers. With polymers that tend to release trace amounts of acid under thermal processing conditions, a hydrotalcite is preferably included in the composition. In acid-sensitive polymers such as polyesters, the N,N'-piperazinebis(neopentylglycol) phosphoramidate should be free or essentially free of acid species as determinable by use of nmr, mass spec, and/or HPLC.

73 Claims, No Drawings

OTHER PUBLICATIONS

Abstract of JP of JP 2000 169731, Jun. 2000, from espacenet database.

Talley, John J., "Preparation of Sterically Hindered Phosphoramidates", J. Chem. Eng. Data, vol. 33, No. 2, 1988, pp. 221–222.

Kirk Othmer, Encyclopedia of Chemical Technology, 4th Edition, vol. 10, 1993, p. 980.

Kirk Othmer, Encyclopedia of Chemical Technology, 4th Edition, vol. 7, 1993, pp. 834,845, and 846.

CAPLUS Abstract of JP 54046250A2, 1979, AN No. 1979:475341.

CAPLUS Abstract of JP 54085242A2, 1979, AN No. 1980–7404.

CAPLUS Abstract of JP 53049054A2, 1978, AN No. 1978:511478.

CAPLUS Abstract of JP 59045352A2, 1984, AN No. 1984:511939.

* cited by examiner

FLAME RETARDANT POLYMER COMPOSITIONS

TECHNICAL FIELD

This invention relates to flame retardant compositions of enhanced effectiveness in which N,N'-piperazinebis(neopentylglycol)phosphoramidate is utilized as a component. More particularly this invention relates to the use of certain additives in combination with N,N'-piperazinebis(neopentylglycol)phosphoramidate and the use of such combinations in polymers, especially thermoplastic polymers, whereby achievement of enhanced flame retardancy is made possible.

BACKGROUND

U.S. Pat. Nos. 5,973,041, 6,221,939 B1 and 6,228,912 B1 show in Example 1 thereof that although N,N'-piperazinebis(neopentylglycol)phosphoramidate (a.k a. N,N'-bis(neopentylenedioxyphosphoryl)piperazine) exhibited satisfactory high temperature properties in polycarbonate as indicated by glass transition temperature (Tg) measurement, this compound was unsatisfactory as a flame retardant as it resulted in an unacceptably high total flame out time (FOT).

It would be of advantage if a way could be found of enhancing the effectiveness of N,N'-piperazinebis(neopentylglycol)phosphoramidate as a flame retardant. This invention is deemed to fulfill this objective in an effective manner.

BRIEF SUMMARY OF THE INVENTION

This invention involves the discovery, inter alia, that despite the poor flame retardancy performance of N,N'-piperazinebis(neopentylglycol)phosphoramidate (a.k.a. N,N'-bis(neopentylenedioxyphosphoryl)piperazine) as reported by the above three U.S. patents, combinations of this compound together with a melamine compound, make it possible to provide polymer blends having substantially improved flame retardant properties.

Moreover, in preferred embodiments this invention makes it possible to provide highly economical thermoplastic compositions that are entirely free of the environmental concerns attributed to halogen-containing additives and also antimony-containing components often used in polymeric materials. In addition, this invention makes it possible to provide flame retarded thermoplastic compositions in which the physical properties needed for end use applications are not materially impaired. In fact, in certain preferred embodiments, compositions having increased melt flow properties are provided.

Accordingly, this invention provides in one of its embodiments a flame retardant additive composition which comprises a blend of the following:

a) N,N'-piperazinebis(neo-pentylglycol) phosphoramidate; and
b) at least one co-additive which is (i) melamine, (ii) one or more melamine compounds, or (iii) both of (i) and (ii).

Another embodiment is a resin composition comprising a thermoplastic polymer with which has been blended, singly and/or in admixture, a flame retardant amount of:

a) N,N'-piperazinebis(neopentylglycol)phosphoramidate; and
b) at least one co-additive which is (i) melarnine, (ii) one or more melamine compounds, or (iii) both of (i) and (ii).

Preferably, but not necessarily, the above additive composition and resin compositions are halogen-free (as defined herein) and also antimony-free.

A further embodiment is a flame retardant resin composition comprising:

A) an acid-sensitive thermoplastic polymer;
B) N,N'-piperazinebis(neopentylglycol)phosphoramidate that is free or essentially free of acid species; and
C) at least one co-additive which is (i) melamine, (ii) one or more melamine compounds, or (iii) both of (i) and (ii);

and/or any resultant reaction product or products thereof that are present in said composition.

The thermoplastic polymer compositions of this invention are characterized in that they are able to provide standard test specimens for the UL 94 test procedure having or giving at least a V-2 rating in said test procedure with standard test specimens of at least one of the following thicknesses: (1) 1/16-inch thickness or (2) 1/8-inch thickness. Preferred compositions are those as just described in which the standard test specimens for the UL 94 test procedure of at least one of the thicknesses of (1) or (2) have or give a V-0 rating in that test procedure. Most preferably specimens of both such thicknesses have or give a V-0 rating. The UL 94 test procedure referred to herein is the procedure as published in Underwriters Laboratories Inc. Standard for Safety UL-94 "Test for Flammability of Plastic Materials for Parts in Devices and Appliances".

Other embodiments of the invention exist, and will be further apparent from the ensuing description and the appended claims.

FURTHER DETAILED DESCRIPTION

A number of melamine compounds are deemed suitable for use in the practice of this invention. In this connection, by "melamine compound" or "melamine compounds" is meant an additive compound or additive compounds having at least one 6-membered triazine ring or moiety therein in which at least one amino nitrogen atom is directly bonded to at least one such triazine ring on a carbon atom of the ring. When the melamine compound contains more than one such ring or moiety, the rings or moieties can be in the form of fused ring structures (as in melem or melon) or unfused ring structures (as in melam). One type of candidate melamine compounds for use as co-additives of this invention are melamine and N-hydrocarbyl or N-halohydrocarbyl derivatives of melamine of the general formula:

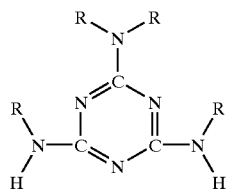

where each R is, independently, a hydrogen atom, a $C_{1-6}$ alkyl group, a $C_{5-6}$ cycloalkyl group, $C_{1-6}$ haloalkyl group, a $C_{5-6}$ halocycloalkyl group, a $C_{6-12}$ aryl group, or a $C_{6-12}$ haloar $C_{7-12}$ aralkyl group, or a $C_{7-12}$ haloaralkyl group. A few non-limiting examples of this type of melamine compounds include melamine, N-methylmelamine, N-cyclohexylmelamine, N-phenylmelamine, N,N-dimethylmelamine, N,N-diethylmelamine, N,N-dipropylmelamine, N,N'-dimethylmelamine, N,N',N"-trimethylmelamine, N-trifluoromethylmelamine, N-(2- chloroethyl)melamine, N-(3-bromophenyl)melamine, and the like. Also alcohol derivatives of melamine such as trimethylolmelamine or triethylolmelamine may be used. Melamine sulfate and melamine phosphates such as melamine orthophosphate, melamine polyphosphate, and dimelamine orthophosphate may also be used. Another useful melamine compound is melammonium pentate (i.e., the dimelamine salt of pentaerythritol diphosphate). Still other melamine compounds that may be used are melam, melem, and melon. Preferred melamine compounds are melamine pyrophosphate and melamine cyanurate, each of which is available commercially. Melamine can be used singly or in admixture with one or more other melamine compounds, provided the mixture is effective as a flame retardant. Likewise melamine compounds may be used singly or as mixtures of two or more melamine compounds, provided the mixture is effective as a flame retardant. Methods for the preparation of melamine compounds are known and reported in the literature. See for example U.S. Pat. No. 4,298,518; Kirk-Othmer *Encyclopedia of Chemical Technology*, Fourth Edition, volume 7, pages 748–752; Id., volume 10, page 980; and E. Prill, *J. Am. Chem. Soc.*, 1947, 69, 62.

A method for the preparation of N,N'-piperazinebis (neopentylglycol)phosphoramidate (hereinafter sometimes referred to as PBNGP) has been reported in Japan Kokai 54/019919. A more practical process is described hereinafter.

It has been found that when using PBNGP as a flame retardant in an acid-sensitive substrate or host polymer such as polybutylene terephthalate, the presence of excessive acid species in the PBNGP can result in severe degradation of properties of the molded polymer, such as color, tensile strength, or the like. Such acid species can include free acids such as HCl or HBr, amine hydrohalide, and/or any acid or acidic impurities resulting for example from hydrolysis and/or other transformations occurring in the PBNGP product or the starting materials used in its synthesis. There are different ways of combating this adverse situation. One way is to add a sufficient amount of one or more acid scavenger additives to the polymer blend to negate the adverse effects of the acid species. A preferred way is to use PBNGP that is free or essentially free of acid species as determinable by use of nmr, mass spec, and/or HPLC. As shown hereinafter, if the PBNGP has been sufficiently washed with a suitable aliphatic halohydrocarbon solvent (and optionally separately with water as well) so that it is a snow-white product, it is likely that nmr, mass spec, and/or HPLC will show that the product is free or essentially free of acid species. Among the thermoplastic polymers that are acid-sensitive are polyesters, polyamides, polycarbonates, polycarbonate-ABS blends, and the like. In this connection, it is not presently possible to quantify the term "essentially free" because the small amount of acid species that can be tolerated in the polymer blend without encountering significant degradation in polymer properties will depend upon such factors as the particular polymer being used, the concentration of PBNGP being used, the temperature conditions under which the polymer is being processed, and the amount of degradation that is deemed acceptable under a given set of circumstances. Moreover, conventional criteria such as acid number have not been found applicable to PBNGP because of its extremely low solubility in water; conventional acid number titrations with KOH cannot be used. What can be stated is that the lower the content, if any, of acid species in the PBNGP, the better. Thus as used herein the term "essentially free" involves the application of a common sense approach, i.e., the PBNGP is essentially free of acid species if the amount of acid species that is present therein is insufficient to cause any unacceptable degradation in properties of the molded polymer composition. Accordingly, if nmr, mass spec, and/or HPLC indicates that acid or acidic species are present in the PBNGP, a representative sample of the PBNGP can be washed as described in Example 13 hereinafter until a snow-white PBNGP product having no detectable acid species in the dried product is formed. Then a pair of trial experiments should be carried out in which a given quantity of the original untreated PBNGP is blended into one portion of the selected substrate polymer, and the same quantity of the treated (washed and dried) acid-free PBNGP is blended into another identical portion of the same substrate polymer. Then the two blends should be separately molded under the same conditions into test specimens and physical properties of the respective specimens determined, using tests such as shown in Table 3 hereinafter. If the tests show that the untreated and the washed specimens have acceptable properties, the untreated PBNGP is deemed to be "essentially free" of acid or acidic species. But if the properties of the unwashed specimens are significantly degraded as to be unacceptable as compared to the properties of the treated specimen, the untreated PBNGP does not qualify as being "essentially free" of acid or acidic species.

Since the PBNGP is useful as a flame retardant in thermoplastic polymers that are acid-sensitive as well as thermoplastic polymers that are not acid-sensitive (e.g., polyolefin polymers) it is preferred that the PBNGP used in the practice of this invention is free or essentially free of acid species as determinable by use of nmr, mass spec, and/or HPLC. However in cases where PBNGP is to be used only in substrate thermoplastic polymers that are not acid-sensitive, the PBNGP need not be free or essentially free of acid species as determinable by use of nmr, mass spec, and/or HPLC.

Those of ordinary skill in the art of analytical chemistry have the knowledge and skills necessary for determining by use of nmr, mass spec, and/or HPLC whether the PBNGP is free or essentially free of acid species.

The relative proportions as between one or more melamine compounds (hereinafter sometimes referred to individually and collectively as "co-additive") and PBNGP can vary. Preferably the weight ratio of PBNGP to co-additive will be in the range of about 0.1:1 to about 5:1, and more preferably in the range of about 0.2:1 to about 4:1. Still more preferably the weight ratio of PBNGP to co-additive will be in the range of about 0.5:1 to about 2:1. Departures from these ranges are permissible whenever deemed necessary or desirable without departing from the scope of this invention.

A flame retardant amount of the combination of PBNGP and co-additive is used in the thermoplastic polymer compositions of this invention. The term "flame retardant amount" as used herein, including the claims hereof, means that the total amount of PBNGP and co-additive used in forming the polymer blend is at least the minimum amount needed with the particular polymer with which PBNGP and co-additive are blended, whether blended singly and/or in admixture, to enable molded test specimens of at least one of the following thicknesses: (1) ¹⁄₁₆-inch thickness or (2) ⅛-inch thickness to exhibit at least a V-2 rating in the UL-94 test procedure. Thus more than such minimum amount of PBNGP and co-additive relative to the amount of polymer can be used in these situations and be considered a flame retardant amount, provided that the weight ratio of PBNGP and co-additive to polymer is not so high as to make it impossible to prepare from such a blend molded specimens that are substantially uniform in composition from specimen to specimen and that have acceptable properties. On the other hand, in connection with masterbatch blends or powder preblends that are prepared for future dilution with additional polymer of (i) preparatory to making finished molded, extruded or foamed shapes or objects (articles), any amount of PBNGP and co-additive that is above the minimum "flame retardant amount" can be used. In connection with what constitutes a flame retardant amount, a V-1 rating is better than a V-2 rating and a V-0 rating is better than a V-1 rating, and thus the phrase "at least a V-2 rating" means that the specimens satisfy the requirements of a V-2 rating, and may satisfy the requirements for a V-1 or V-0 rating, or both. Preferred compositions yield test specimens exhibiting at least a V-1 rating. Most preferred compositions yield test specimens exhibiting a V-0 rating.

Thermoplastic polymers with which the additives of this invention can be blended include such polymers as polystyrene; copolymers of two or more styrenic monomers such as styrene, vinyltoluene, ethylstyrene, tert-butylstyrene, a-methylstyrene, vinylnaphthalene, etc.; rubber-modified vinylaromatic homopolymers or copolymers (e.g., high impact polystyrene); styrenic copolymers such as ABS, SAN, MABS; thermoplastic polyesters such as polyethylene terephthalate, polybutylene terephthalate, polytrimethylene terephthalate, polycyclohexylene terephthalate, etc.; thermoplastic polyamides, such as nylon 6, nylon 66, nylon 6,12, etc.; polycarbonates, polyphenylene oxides, such as poly(2,6-dimethylphenylene oxide); polysulphones; polyolefins, such as polyethylene, polypropylene, poly(1-butene), copolymers of ethylene with one or more higher vinyl olefins such as propylene, 1-butene, 1-pentene, 1-hexene, 1-heptene, 1-octene; and blends or composites of different polymers such as for example a blend of poly(2,6-dimethylphenylene oxide) and polystyrene, a blend of poly(2,6-dimethylphenylene oxide) and HIPS, or a blend of aromatic polycarbonate and ABS.

Thermoplastic and thermoplastic elastomeric polyesters constitute a preferred type of polymer used in the practice of this invention. Non-limiting examples of such polyesters for use in this invention include poly(ethylene terephthalate), poly(1,3-propylene terephthalate), poly(1,4-butylene terephthalate), poly(cyclohexanedimethanol terephthalate), poly(cyclohexanedimethanol-co-ethylene terephthalate), polyethylene naphthalate, polybutylene naphthalate, and polyarylates. Illustrative, non-limiting examples of thermoplastic elastomeric polyesters (commonly known as TPE) include polyetheresters such as poly(alkylene terephthalate)s (particularly poly[ethylene terephthalate] and poly[butylene terephthalate]) containing soft-block segments of poly(alkylene oxide), particularly segments of poly(ethylene oxide) and poly(butylene oxide); and polyesteramides such as those synthesized by the condensation of an aromatic diisocyanate with dicarboxylic acids and a carboxylic acid-terminated polyester or polyether prepolymer. Poly(1,4-butylene terephthalate) (often referred to as PBT) is a particularly preferred substrate or host polymer.

Various thermoplastic polymers suitable for use in the practice of this invention can be obtained from a number of commercial sources.

The polymer compositions of this invention can be in the form of a preblend (e.g., a powder blend) comprised of the thermoplastic polymer, PBNGP, and co-additive, which can be molded or extruded under suitable temperature and pressure conditions to form a shape or object, whether foamed (expanded) or in non-foamed (non-expanded) condition. Likewise the compositions can be in the form of the molded or extruded shape or object itself. Also, the polymer compositions of this invention can be in the form of a masterbatch or concentrated preblend in which the concentration of the flame retardant components therein is higher than the intended concentration in the ultimate finished molded shape or object to be fabricated. Such masterbatch or concentrated preblend is mixed or blended with additional polymer either as dry materials or as a melt blend which is then molded or extruded to produce the finished shape or object.

When pursuant to this invention the flame retardant components above are blended in a flame-retardant amount into the thermoplastic polymer (preferably but not necessarily in the absence of any halogen-containing flame retardant additive, and also preferably but not necessarily in the absence of any antimony-containing additive component as well), the resultant polymer composition provides molded test specimens which exhibit at least a V-2 rating using standard test specimens that are at least of one of the following thicknesses: (1) $\frac{1}{16}$-inch and (2) $\frac{1}{8}$-inch, if subjected to the well-known standard UL-94 test procedure. Preferred compositions of this invention exhibit a V-0 rating when using standard test specimens of at least one of the following thicknesses: (1) $\frac{1}{16}$ or (2) $\frac{1}{8}$-inch, if subjected to the standard UL-94 test procedure. As noted above, in forming the blends of this invention the individual flame retardant components (PBNGP and co-additive) can be separately blended with the substrate polymer. Preferably however, a preformed mixture of PBNGP and co-additive is employed in the blending operation. In this way the likelihood of blending errors is reduced, and in general the blending operation is rendered more facile.

The flame retarded polymer compositions can constitute finished polymer compositions containing a flame retardant amount of the flame retardants of this invention as defined above. Typically the total amount of the PBNGP and co-additive components blended into the substrate or host polymer will be in the range of about 10 to about 60 weight percent, although it is more desirable in most cases that the finished composition contains a flame retardant amount in the range of about 20 to about 55 weight percent. Thermoplastic polymer compositions containing a flame retardant amount of PBNGP and co-additive or their reaction products in the range of about 20 to about 50 weight percent are preferred. Particularly preferred are thermoplastic polymer compositions containing a flame retardant amount of PBNGP and co-additive or their reaction products in the range of about 25 to about 50 weight percent. In all cases the foregoing weight percentages are based on the total weight of the PBNGP and co-additive(s) used and of the substrate or host polymer(s) used in forming the flame retarded polymer composition. Therefore, the weight of other components, if any, used in making the flame retarded polymer composition is excluded from these ranges. In addition it is to be clearly understood that when it is indicated that the polymer "contains" a given quantity of an additive, such additive need not remain in the same chemical form as it existed prior to being introduced into the blending operation with the polymer(s) and/or other additive component(s). Such components may, especially during melt blending and/or during molding operations, enter into some type(s) of chemical reactions and/or other chemical changes or transformations. In short, the percentages of additive components should be read as one would read a recipe for making a cake. Certain specified amounts of things like yeast, flour, butter, eggs, salt, milk, and so on are blended together and the mixture is baked. No one really cares whether these ingredients still exist as such or whether they have lost their original chemical makeups—the important things are that they were what they were when introduced into the mixture and that the overall result was favorable.

As noted above, one way of forming such polymer compositions is by use of masterbatch or additive-rich preblend compositions made from the substrate polymer and a higher percentage of the PBNGP and co-additive than the percentage to be included in the ultimate finished product. Such masterbatches or additive-rich preblend compositions will typically be a melt blended masterbatch or a powder preblend made from about 20 to about 90 parts by weight of the PBNGP and co-additive per hundred parts by weight of these flame retardants plus the substrate or host polymer(s). Such masterbatch and additive-rich preblend compositions, which constitute additional embodiments of this invention, can subsequently be used in forming finished polymer compositions by blending an appropriate amount of the masterbatch or additive-rich preblend with an appropriate amount of the substrate or host thermoplastic polymer(s) to thereby produce a blend having the desired end use proportions of the flame retardant components in whatever form they exist after being blended together.In preferred embodiments of this invention, no bromine- or chlorine-containing flame retardant additive component is intentionally added to the compositions of this invention. Consequently, preferred polymer compositions of this invention do not contain bromine or chlorine contents from flame retardant additives except for impurities which may occur therein as a consequence of the materials (solvents, catalysts, etc.), the process, or the process equipment used in the synthesis or manufacture of the polymer or in the synthesis of any of what purport to be bromine- or chlorine-free additive components that are used therein. Typically the preferred additive compositions, e.g., a masterbatch or preblend of the flame retardant components, which can be used in accordance with this invention to prepare preferred finished polymer compositions of this invention, will contain, if any, no more than about 1000 parts by weight of bromine and/or chlorine as impurities per million parts by weight (ppmw) of additive composition, and thus the term "halogen-free" in connection with such additive compositions means that they contain, if any, no more than about 1000 ppmw of bromine and/or chlorine. Preferred finished polymer compositions of this invention will typically contain, if any, no more than about 100 parts by weight of bromine and/or chlorine impurities per million parts by weight of the total polymer composition. Therefore, the term "halogen-free" as used herein in connection with preferred finished polymer compositions means that they contain, if any, no more than about 100 ppmw of bromine and/or chlorine. Usually they will contain less bromine and/or chlorine than this, unless a bromine- and/or chlorine-containing solvent or a bromine- and/or chlorine-containing halogen-containing gas is used in preparing the resin or a foam produced from a preferred polymer composition of this invention. These preferred halogen-free compositions of this invention can, however, contain fluorine-containing components such as polytetrafluoroethylene and/or related fluoropolymers as the term "halogen-free" as used herein applies only to bromine and/or chlorine.

Similarly, in preferred embodiments no antimony-containing additive is intentionally added to a composition of this invention. Such preferred compositions are devoid of antimony-containing components except possibly for adventitious trace amounts which possibly may find their way into the polymer blends through contamination of blending equipment by antimony additives such as antimony oxides previously used in such equipment.A further embodiment of this invention is the method of rendering a thermoplastic polymer flame resistant which comprises incorporating therein PBNGP and co-additive in an amount such that the resultant polymer composition contains a flame retardant amount of these components in whatever chemical composition and form such components exist in the resultant polymer composition. As noted above, such polymer composition can provide test specimens exhibiting at least a V-2 rating, and preferably a V-0 rating, in the UL-94 test procedure. It is possible to incorporate the PBNGP and co-additive in the substrate polymer prior to, or during, formation of the polymer. For example, such components may possibly be added to the monomer(s) or to the polymerization system to be used in forming the polymer. Similarly, it may be possible to add the PBNGP and co-additive to the polymerization mixture during the course of the polymerization reaction itself. Preferably however, the PBNGP and co-additive are added to the thermoplastic polymer after the polymer has been produced. It will also be appreciated that the possibility exists for additions being made in stages, such as prior to and during the polymerization, or prior to and after the polymerization, or during and after the polymerization, or prior to, during and after the polymerization.

Flame retarded thermoplastic polymer compositions of this invention such as thermoplastic polyesters and thermoplastic polyamides intended for use in applications where added strength and dimensional stability are of importance, preferably contain reinforcing amounts of at least one reinforcing agent or component. Non-limiting examples of such reinforcing agents or components include glass fibers, carbon fibers, metal strands or whiskers, and similar reinforcing materials. In certain applications use of glass fibers cut into two or more different lengths can be especially useful. Glass-reinforced thermoplastic polyesters flame retarded pursuant to this invention, such as flame retarded glass-filled or glass-reinforced PET or PBT, constitute particularly preferred reinforced thermoplastic compositions of this invention.

It is also within the scope of this invention to include one or more other phosphorus-containing flame retardants in the compositions of this invention. Non-limiting examples of other phosphorus additives which can be used include those described as useful flame retardants in U.S. Pat. Nos. 3,997,505; 4,007,236; 4,018,560; 4,053,450; 4,365,033; 4,373,103; 4,808,744; 5,973,041; 6,221,939 B1; and 6,228,912 B1.

Still other ingredients such as extrusion aids (e.g., barium stearate, magnesium stearate, or calcium stearate), dyes, pigments, fillers, stabilizers, antioxidants, antistatic agents, reinforcing agents, UV stabilizers, nucleating agents, acid neutralizers, polymer clarifiers, and the like can be included in the polymer compositions of this invention. U.S. Pat. No. 6,060,543, provides an extensive listing of typical polymer additives from which suitable additive components can be selected. For example, phenolic antioxidants can be found within the disclosure of that patent from Column 34, line 28 through Column 37, line 35. From Column 37, line 36 through Column 40, line 2 of that patent is a listing of UV absorbers and light stabilizers from which suitable components can be selected. Suitable metal deactivators or passivators can be found in the disclosure of that patent in Column 40, lines 3–12. The patent at Column 42, lines 31 through 38 lists nucleating agents, and at Column 42 from lines 39 through 43 lists fillers and reinforcing agents, from which components of these types can be selected. Suitable thiosynergists, peroxide scavengers, polyamide stabilizers, and basic co-stabilizers can be found within the listings at Column 41, lines 49 through 67, and Column 42, lines 29 and 30 of the patent. All of these passages of the patent are incorporated herein by reference with the caveat that each component that is selected from such listings must not in the amount used materially affect adversely the properties of the composition of this invention in which it is employed.

Non-limiting examples of nucleating agents which can be used are sodium 2,2'-methylenebis(4,6-di-tert-butylphenyl) phosphate, sodium adipate, sodium diphenylacetate, sodium benzoate, and talc. Non-limiting examples of polymer clarifiers which can be used include 1,3:2,4-bis(3,4-dimethylbenzylidene)sorbitol (Millad 3988; Millikan Chemical), 1,3 :2,4-bis-(p-methylbenzylidene)sorbitol (Millad 3940; Millikan Chemical), and 1,3 :2,4-di-O-benzylidenesorbitol (Millad 3905; Millikan Chemical).

Acid neutralizers or acid scavengers which can be, and preferably are used, in thermoplastic polymers, such as thermoplastic polyesters, in which trace amounts of acids may be released during thermal processing include such materials as tetrasodium pyrophosphate, zeolites, metal oxides (e.g., zinc oxide, magnesium oxide, and titanium dioxide), metal carbonates (e.g., calcium carbonate, and magnesium carbonate) and natural or synthetic hydrotalcites (e.g., magnesium hydrotalcites such as DHT-4A, DHT-4V, DHT-4C (all available from Kyowa Chemical Co.); Hysafe 539 and Hysafe 530 (available from J.M. Huber Corporation); L-55R acid neutralizers (available from Reheis Inc.); and zinc hydrotalcites such as ZH4-A (available from Kyowa Chemical Co.). Preferred acid neutralizers are magnesium hydrotalcites such as DHT-4A, DHT-4A2, DHT-4V, DHT-4C and Hysafe 530.

The hydrotalcite which is a preferred component in the practice of this invention, is preferably a monohydrotalcite or a dihydrotalcite, and such hydrotalcite is a magnesium-aluminum hydrotalcite, and may be represented by the following formula:

$$Mg_{1-x} \cdot Al_x(OH)_2 \cdot A_{x/2} \cdot MH_2O$$

wherein x stands for a value greater than 0 but equal to or smaller than 0.5 ($0 < x \leq 0.5$), A represents $CO_3^{2-}$ or $SO_4^{2-}$, and M stands for a positive value.

In general, the hydrotalcite is preferably a magnesium-aluminum composite hydroxide carbonate salt, and is more preferably represented by the general formula:

$$Mg_6 \cdot Al_2(OH)_{16} \cdot CO_3 \cdot 8H_2O$$

wherein g is 0 or has a positive value. Hydrotalcite may also be represented by the following formula:

$$M_x \cdot Al_y \cdot (OH)_{2x+3y-2z} \cdot (A)_z \cdot 2H_2O$$

wherein M represents Mg, Ca or Zn, A denotes $CO_3$ or $HPO_4$, x, y, and z stand for positive values.

The empical formulas as given by a commercial supplier for several of the preferred hydrotalcites that can be used are as follows:

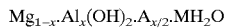
$Mg_{4.5}Al_2(OH)_{13} \cdot CO_3$

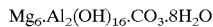
$Mg_{4.5}Al_2(OH)_{13} \cdot CO_3 \cdot 3H_2O$

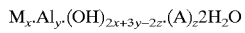
$Mg_{4.5}Al_2(OH)_{13} \cdot CO_3 \cdot 3.5H_2O$ $Mg_{4.5}Al_2(OH)_{13} \cdot O_{0.2}(CO_3)_{0.8}$ Various known procedures can be used to prepare the blends or formulations constituting the compositions of this invention. For example the components to be incorporated into the finished blend can be blended together in powder form and thereafter molded by extrusion, compression, or injection molding. Likewise the components can be mixed together in a Banbury mixer, a Brabender mixer, a roll mill, a kneader, or other similar mixing device, and then formed into the desired form or configuration such as by extrusion followed by comminution into granules or pellets, or by other known methods.

The compositions of this invention can be utilized in the formation of useful articles of the type normally fabricated by molding or extrusion of conventional flame retarded polymers. Likewise it is possible to prepare foamed or expanded shapes and objects from the compositions of this invention. Molding and extrusion conditions such as temperatures and pressures are within conventional recommended limits. Conditions normally used for producing foamed or expanded shapes and objects from flame retarded ABS can be used with the compositions of this invention, with little or no modification.

The following examples, in which percentages are by weight based on the total weight of the entire composition, are presented for purposes of illustration and not limitation.

EXAMPLES 1–3

PBT (Valox 305 from General Electric) was dried for 4 hours at 121° C. in a desiccant dryer immediately prior to use. The PBT and all additives were blended together in the proportions shown in Table 1, and fed into a Werner-Pfleiderer ZSK-30 twin-screw extruder at a rate of 6 kilograms per hour. The temperature profile was 285° C. in each zone, and the extruder was set at 100 rpm. The extruded strand was cooled in a water bath, pelletized, dried for 4 hours at 121° C. in a desiccant dryer, and injection molded. The injection molding was conducted using a Battenfield BA350CD injection molding machine. The temperature profile was 246 to 271° C., with a mold temperature of 79° C. The molded test specimens were subjected to the vertical flame test according to the UL-94 procedure. Compositions and test results are summarized in Table 1, wherein the melamine cyanurate used was Budit 315 (Chemische Fabrik Budenheim, Budenheim, Germany), and the glass fiber used was PPG 3563 fiberglass. Blanc fixe is barium sulfate. Example 1 is illustrative of this invention. Examples CE-2 and CE-3 are presented for comparative purposes.

TABLE 1

| Example | 1 | CE-2 | CE-3 |
|---|---|---|---|
| PBT | 35.5% | 35.5% | 43.5% |
| PBNGP | 19% | 38% | — |
| Melamine cyanurate | 19% | — | 30% |
| Hysafe 510 hydrotalcite | 0.5% | 0.5% | 0.5% |
| Blanc Fixe "N" grade | 6% | 6% | 6% |
| Fiberglass | 20% | 20% | 20% |
| UL-Rating, ⅛" thickness | V-0 | Burn | Burn |
| UL-Rating, 1/16" thickness | V-0 | Burn | Burn |

EXAMPLES 4–11

A number of test specimens were prepared from various formulations of this invention as in Examples 1–3 and subjected to the vertical flame test according to the UL-94 procedure and several standard physical property determinations. The materials tested and the test results are summarized in Table 2. The melamine pyrophosphate used was Aeroguard MPP (Cytec Industries, Inc., Newark, N.J.). The melt flow test conditions used were 250° C. and 2.16 kg load).

TABLE 2

|  | Example | | | | | | | |
| --- | --- | --- | --- | --- | --- | --- | --- | --- |
|  | 4 | 5 | 6 | 7 | 8 | 9* | 10 | 11 |
| PBT | 35.5% | 41.5% | 44.5% | 57.5% | 41.5% | 50.5% | 35.5% | 35.5% |
| PBNGP | 7% | 7% | 10% | 12% | 12% | 12% | 18% | 25% |
| Melamine pyrophosphate | 31% | 31% | 25% | 20% | 20% | 15% | 20% | 13% |
| Hysafe 510 hydrotalcite | 0.5% | 0.5% | 0.5% | 0.5% | 0.5% | 0.5% | 0.5% | 0.5% |
| Blanc Fixe "N" grade | 6% | — | — | — | 6% | — | 6% | 6% |
| Fiberglass | 20% | 20% | 20% | 20% | 20% | 20% | 20% | 20% |
| UL-Rating, 1/8" thickness | V-0 | V-0 | V-0 | Burn | V-0 | Burn | V-0 | V-0 |
| UL-Rating, 1/16" thickness | V-0 | V-0 | V-1 | V-2 | Burn | V-2 | V-0 | V-2 |
| IZOD impact strength (ft-lb/in) | 0.5 | 0.5 | 0.5 | 0.5 | 0.5 | 0.5 | 0.6 | 0.5 |
| DTUL (° C.) | 206 | 203 | 205 | 204 | 204 | 201 | 205 | 205 |
| Melt flow index, g/10 min. | 33.9 | 52.1 | 59.6 | 55.6 | 53.8 | 66.5 | 22.0 | 15.1 |

*Also contained 2% of bisphenol-A diphenylphosphate (NcendX P-30 flame retardant; Albemarle Corporation)

From Table 2 it can be seen that it is possible pursuant to preferred embodiments of this invention to provide flame retardant thermoplastic polymer compositions such as thermoplastic polyester compositions having high melt flow characteristics. In one such embodiment, flame retardant compositions were provided in which the weight ratio of PBNGP:melamine pyrophosphate was in the range of about 0.2:1 to about 0.6:1 (note Examples 4–8). In addition, in a more preferred embodiment where the ratio was in the range of 0.2:1 to about 0.4:1, the UL 94 ratings were very high (note Examples 4–6). The same PBT with 20% of the same glass fiber had a melt flow index under the same conditions of only 23.8 grams/10 minutes and gave bum ratings with both 1/8-inch and 1/16-inch thick test specimens. In another such embodiment, the inclusion of bisphenol-A diphenyl phosphate in the composition increased the melt flow properties of the composition to a still higher level even where the weight ratio of PBNGP:melamine pyrophosphate was as high as 0.8:1 (note Example 9).

N,N'-piperazinebis(neopentylglycol)phosphoramidate of high purity for use in preparing flame retardant compositions of this invention was prepared by an improved, more practical process than described in Japan Kokai 54/019919. In particular, the portionwise addition of a solution of neopentylglycol chlorophosphate to a solution of piperazine and tertiary amine as HCl scavenger in a chloroform was initiated at room temperature and allowed to rise as the result of heat evolved from the reaction. On completion of the reaction, the isolated particulate product was washed with sequentially with chloroform, water, and chloroform until it was snow white. The details of this synthesis procedure are presented in Example 12 in which all reactions were run under nitrogen.

EXAMPLE 12
Synthesis of Neopentylglycol Chlorophosphate

To a suspension of 322 g (3.09 mol) of neopentyl glycol in 1.8 L of methylene chloride were added 498 g (3.25 mol) of $POCl_3$ at room temperature. With the addition of the first 25 mL of $POCl_3$, a clear solution formed and the temperature rose to 34° C. and vigorous HCl evolution started (a water scrubber was used to monitor the HCl evolution). The addition was completed in 4h and the clear reaction mixture was refluxed for 3.5h. Vigorous gas evolution continued during the first 2.5h of refluxing. After cooling to room temperature, the solvent was removed under reduced pressure leaving a white crystalline product. The material was dried in a glove box, to get rid of traces of $POCl_3$ (Unreacted $POCl_3$ can also be removed by washing with cold cyclohexane). M.p. 106° C., yield: 567 g(99%). $^{31}$P-NMR ($CDCl_3$): ca. 1.36 ppm (s).

Synthesis of N,N'-Piperazinebis(neopentylglycol) phosphoramidate

To a solution of 58 g (0.673 mol) of piperazine and 190 mL of triethylamine in 1L of chloroform was added dropwise a solution of 250 g (1.355 mol) neopentylglycol chlorophosphate dissolved in 450 mL of chloroform. The addition was carried out at room temperature in a nitrogen atmosphere. The reaction temperature rose to 57° C. during addition. The white product started falling out as soon as the first drops of chlorophosphate were added. The addition was completed in ca. 2 hours. The reaction mixture turned slightly brownish. Additional 500 mL of chloroform was added to facilitate easier mechanical stirring of the thick reaction mixture. The mixture was stirred at reflux for 4h and at room temperature overnight. The precipitate was suction filtered and washed with chloroform (ca. 3×130 mL), water (2×200 mL) and finally with 150 mL chloroform (or until snow white solid is obtained). The product was air dried. The product is insoluble in most common solvents. The solvent of choice for nmr was hexafluoroisopropanol. Yield: 229 g (89%); Mp.: 343° C.(DSC). $^{31}$P-NMR (hexafluoro IPA): ca. 6 ppm (s). $^1$H-NMR (hexafluoro IPA): ca. 0.9 ppm (s, 6H, $CH_3$); ca. 1.2 ppm (s, 6H, $CH_3$); ca. 3.3 ppm (m, 8H, $CH_2$—N—), 3.9 ppm (m, 4H, $CH_2$—O—), 4.3 ppm (m, 4H, $CH_2$—O—). $^{13}$C-NMR (hexafluoro IPA): 19.9 ppm ($CH_3$), 20.9 ppm ($CH_3$), 32.4 ppm ($CH_2$—N—), 32.5 ppm ($CH_2$—N—), 44.8 ppm (tert, C), 78.7 ppm ($CH_2$—O—) 78.8 ppm ($CH_2$—O—).

Another aspect of this invention is the discovery that certain impurities in the N,N'-piperazinebis (neopentylglycol)phosphoramidate can adversely affect the performance of the product when used as a flame retardant. In particular, it was found that the physical properties of glass-reinforced polybutylene terephthalate were substantially degraded when using an impure sample of N,N'-piperazinebis(neopentylglycol)phosphoramidate (PBNGP) made on a larger scale. as compared to samples produced in the laboratory. As a result of this observation, the impure sample was analyzed by nmr which indicated that the impure sample had the following composition: 95.5% of PBNGP, 2.9% of N-piperazine(neopentylglycol) phosphoramidate (PNGP, a product in which only one of the amino nitrogen groups of the piparazine reacted with neopentylglycol), 0.9% oftriethylamine hydrochloride, and 0.7% of water.

A "purified" PBNGP, i.e., a derivative product of the "impure" product, was then prepared for evaluation. To prepare the derivative product, a sample of the "impure" PBNGP was subjected to the purification procedure given in Example 13.

EXAMPLE 13

A 30-gram sample of the above impure product (indicated by nmr to be composed of 95.5% of PBNGP, 2.9% of PNGP, 0.9% of triethylamine hydrochloride, and 0.7% of water) was suspended in 131 mL of chloroform (22.9% wt. % suspension) and refluxed at ca. 60° C. for 15 min. The suspension was magnetically stirred in a 500 mL Erlenmeyer flask. The suspension was suction filtered through a sintered glass funnel (fine) while hot using reduced pressure. The white solid was then washed with an additional 50 mL of hot chloroform. The material was then transferred to a crystallizing dish and air dried overnight. Analysis of the purified product by nmr indicated that the dried purified product was composed of 96.4% of PBNGP, 2.2% of PNGP, 1.3% of water and 0% of triethylamine hydrochloride. The filtrate was stripped of chloroform under reduced pressure to yield a white solid. Analysis of this solid by nmr indicated its composition to be 45.3% of PBNGP, 31.2% of PNGP, 3.5% of water and 20.0% of triethylamine hydrochloride.

The adverse effect of the impurity content in the impure sample is illustrated in Table 3 wherein samples of the above "impure" and the above "purified" N,N'-piperazinebis (neopentylglycol)phosphoramidate (PBNGP) products were used in forming the respective test specimens. The composition of these two blends of Table 3 were made using the following components:

The above "Impure" or the above "Purified" PBNGP—19 wt %
PBT (Crastin 6134 (DuPont)—35.1 wt %
Glass fibers (Vetrotex 952)—20 wt %
Melamine cyanurate (Melapur MC25)—19 wt %
Blanc Fixe "N" grade—6 wt %
Hydrotalcite (DHT-4A2; Mitsui)—0.5 wt %
Ethanox® 330 Antioxidant (Albemarle Corporation)—0.2 wt %
Wax OP—0.2 wt %

TABLE 3

Comparison of Physical Properties

| Properties | "Impure" PBNGP | "Purified" PBNGP |
|---|---|---|
| Initial properties | | |
| Tensile strength @ fail (5 mm/min) | 51.81 | 68.69 |
| Tensile elongation @ fail (5 mm/min) | 0.84 | 1.34 |
| Tensile modulus (1 mm/min) | 9839 | 10022 |
| Color, L | 81.01 | 90.2 |
| Color, a | 0.73 | 0.1 |
| Color, b | 22.45 | 7.77 |
| Yellowness Index, D1295 | 42.8 | 14.79 |
| Properties after oven aging 1 week @ 180° C. | | |
| Tensile strength @ fail (5 mm/min) | 52.7 | 71.28 |
| Tensile elongation @ fail (5 mm/min) | 0.75 | 1.23 |
| Tensile modulus (1 mm/min) | 9866 | 10532 |
| Color L | 56.32 | 61.57 |
| Color a | 3.84 | 3.74 |
| Color b | 10.37 | 9.06 |
| Yellowness Index, D1295 | 32.95 | 27.73 |

It was thus concluded that the degradation of PBT physical properties was due primarily to the presence of the triethylamine hydrochloride in the impure product. Accordingly, when utilizing PBNGP as a flame retardant in such polymers as thermoplastic polyesters (PBT, PET, etc.), or in polycarbonate-ABS blends, care should be taken to ensure that the PBNGP is devoid of amine or other hydrohalide salts, or at least that it contains such insignificant quantities of such salt(s) as to cause no appreciable degradation of physical properties of the substrate or host polymer. If necessary, an impure product containing amine hydrohalide salts can be purified by a washing procedure such as illustrated in Example 13. Extractive halohydrocarbon organic solvents other than chloroform can be used for this purpose such as for example dichloromethane, 1,2-dichloroethane, bromochloromethane, perchloroethylene, dibromomethane, and similar liquid aliphatic chloro- and/or bromohydrocarbons.

As used herein, including the claims, the term "acid species" means any species of any composition whatsoever that is acidic or that can produce acidic species during conventional processing of a thermoplastic polymer.

It is to be understood that the terms "component" or "ingredient" as used anywhere in the specification or claims hereof, whether the term is used in the singular or plural, are used in the sense that it is a substance employed in forming the composition referred to, and thus at least prior to inclusion, mixing or blending with other ingredients or components, the component or ingredient is in the chemical form specified. It matters not what chemical changes, transformations and/or reactions, if any, take place in the mixture itself as such changes, transformations and/or reactions are the natural result of bringing the specified components or ingredients together under the conditions called for pursuant to this disclosure. Thus the substrate or host polymer such as for example PBT is of course a component or ingredient of the resultant composition even though it is often present in larger quantity than the additive(s) blended therewith. Thus all references for example to PBT polymers or resins are to be understood as referring to the PBT polymer or resin employed in forming the composition referred to, and thus at least prior to inclusion, mixing or blending therewith of other component(s) or ingredient(s), the resin (polymer) is in the chemical form specified. It matters not what chemical changes, transformations and/or reactions, if any, take place in the polymer or resin itself or in the additives used, as such changes, transformations and/or reactions are the natural result of bringing the specified components or ingredients together in accordance with this disclosure.

It is also to be understood that even though the claims hereinafter may refer to substances in the present tense ("comprises", "is", etc.), the reference is to the substance, as it existed at the time just before it was first contacted, blended or mixed with one or more other substances in accordance with the present disclosure. For example, in a claim the phrase "wherein C) of said composition is melamine cyanurate", means that just before C) was put into such composition it was melamine cyanurate, and that in the resultant composition, the original melamine cyanurate may remain and exist as melamine cyanurate, or (a) all or some of the melamine cyanurate may have reacted with one or more other components of the composition, and/or (b) all or some of the melamine cyanurate may have undergone total or partial decomposition, e.g., during melt blending, so that in either such case of (a) and/or (b) some or all of the melamine cyanurate no longer exists as such. In short, "is" in such phrase should be understood to identify the ingredient used in forming the composition, and not necessarily the chemical form in which the ingredient actually exists in the composition. The same reasoning applies to such terms as "comprises", "comprising", "consists essentially", and "consisting essentially"—i.e., these terms should be understood to identify the ingredients used in forming the composition, and not necessarily the chemical form in which the ingredients actually exist in the composition, and provided of course that the ingredients are brought together and maintained under ordinary suitable conditions using the ordinary skill and common sense of one having ordinary skill in the art.

Each and every patent referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A flame retardant additive composition which comprises a blend which is the additive product of the following components (a) N,N'-piperazinebis(neopentylglycol)phosphoramidate; and (b) at least one melamine compound which is (i) melamine, (ii) one or more melamine compounds, or (iii) both of (i) and (ii), and any resultant reaction product or products thereof that are present in said composition, said composition having (a) to (b) in an (a):(b) weight ratio in the range of about 0.1:1 to about 5:1.

2. A composition according to claim 1 wherein (b) of said composition is melamine cyanurate.

3. A composition according to claim 1 wherein (b) of said composition is melamine pyrophosphate.

4. A composition according to claim 1 wherein said composition is free of any added bromine- or chlorine-containing flame retardant, and is antimony-free.

5. A composition according to claim 4 wherein (b) of said composition is melamine cyanurate.

6. A composition according to claim 4 wherein (b) of said composition is melamine pyrophosphate.

7. A composition according to claim 1 wherein (a) is free or essentially free of acid species.

8. A composition according to claim 7 wherein (b) of said composition is melamine cyanurate.

9. A composition according to claim 7 wherein (b) of said composition is melamine pyrophosphate.

10. A flame retardant resin composition comprising:
    A) at least one thermoplastic polymer;
    B) N,N'-piperazinebis(neopentylglycol)phosphoramidate;
    C) at least one melamine compound which is (i) melamine, (ii) one or more melamine compounds, or (iii) both of (i) and (ii);
    and any resultant reaction product or products thereof that are present in said composition.

11. A composition according to claim 10 wherein C) of said composition is melamine cyanurate.

12. A composition according to claim 10 wherein C) of said composition is melamine pyrophosphate.

13. A composition according to claim 10 wherein said composition is free of any added bromine- or chlorine-containing flame retardant, and is antimony-free.

14. A composition according to claim 13 wherein C) of said composition is melamine cyanurate.

15. A composition according to claim 13 wherein C) of said composition is melamine pyrophosphate.

16. A composition according to claim 10 wherein said composition has B) and C) in a B):C) weight ratio in the range of about 0.1:1 to about 5:1.

17. A composition according to claim 10 wherein said at least one thermoplastic polymer consists essentially of at least one acid-sensitive polymer, and wherein B) is free or essentially free of acid species.

18. A composition according to claim 10 wherein said at least one thermoplastic polymer consists essentially of a thermoplastic polyester, and wherein B) is free or essentially free of acid species.

19. A composition according to claim 18 wherein said composition contains a reinforcing amount of a reinforcing agent.

20. A composition according to claim 18 wherein said composition contains a reinforcing amount of glass fiber.

21. A composition according to claim 20 wherein said thermoplastic polyester is a poly(1,4-butylene terephthalate).

22. A composition according to claim 10 wherein said composition further comprises at least one hydrotalcite and any resultant reaction product or products thereof that are present in said composition.

23. A composition according to claim 18 wherein said composition further comprises at least one hydrotalcite and any resultant reaction product or products thereof that are present in said composition.

24. A composition according to claim 23 wherein said composition contains a reinforcing amount of glass fiber.

25. A composition according to claim 24 wherein said thermoplastic polymer is a poly(1,4-butylene terephthalate).

26. A flame retardant resin composition comprising a blend of at least the following ingredients:
    A) a poly(1,4-butylene terephthalate);
    B) N,N'-piperazinebis(neopentylglycol)phosphoramidate that is free or essentially free of acid species;
    C) at least one co-additive which is (i) melamine cyanurate, or (ii) melamine pyrophosphate, or (iii) both of (i) and (ii);
    said composition having B) and C) in a weight ratio of B):C) in the range of 0.1:1 to 5:1.

27. A composition according to claim 26 wherein said composition contains at least one hydrotalcite and any resultant reaction product or products thereof that are present in said composition, and wherein said composition also contains a reinforcing amount of glass fiber.

28. A composition of claim 10 in the form of a molded or extruded shape or object.

29. A composition of claim 13 in the form of a molded or extruded shape or object.

30. A composition of claim 19 in the form of a molded or extruded shape or object.

31. A composition of claim 22 in the form of a molded or extruded shape or object.

32. A composition of claim 24 in the form ofa molded or extruded shape or object.

33. A composition ofclaim 26 in the form of a molded or extruded shape or object.

34. A method of forming a flame retardant polymer composition which comprises blending together components comprising (1) at least one thermoplastic polymer, and (2) a flame retardant amount of:
    (a) N,N'-piperazinebis(neopentylglycol)phosphoramidate and
    (b) at least one melamine compound which is (i) melamine, (ii) one or more melamine compounds, or (iii) both of (i) and (ii).

35. A method of claim 34 wherein said at least one melamine compound is melamine cyanurate or melamine pyrophosphate, or both of these.

36. A method of claim 34 wherein (1) and (2) are blended together while (1) is in the form of a molten polymer.

37. A method of claim 34 wherein (1) and (2) are in the form of powders or particles and wherein (1) and (2) are blended together as powders or particles.

38. A method of claim 34 wherein said thermoplastic polymer is at least one acid-sensitive thermoplastic polymer and wherein (a) is free or essentially free of acid species.

39. A method of claim 34 wherein said thermoplastic polymer is at least one thermoplastic polyester and wherein (a) is free or essentially free of acid species.

40. A method of claim 39 wherein a reinforcing amount of glass fiber is included in said composition.

41. A method of claim 39 wherein said at least one melamine compound is melamine cyanurate or melamine pyrophosphate, or both of these.

42. A method of claim 39 wherein at least one hydrotalcite is included in said composition.

43. In a method of producing a flame retarded molded or extruded shape or object, which method comprises molding or extruding a flame retardant thermoplastic polymer, the improvement which comprises molding or extruding a molten thermoplastic composition made from components comprising (1) at least one thermoplastic polymer, (2) at least one acid neutralizer or acid scavenger, and (3) a flame retardant amount of:
   (a) N,N'-piperazinebis(neopentylglycol)phosphoramidate and
   (b) at least one melamine compound which is (i) melamine, (ii) one or more melamine compounds, or (iii) both of (i) and (ii).

44. The improvement of claim 43 wherein said at least one melamine compound of (b) used is melamine cyanurate or melamine pyrophosphate, or both.

45. The improvement of claim 43 wherein said thermoplastic polymer of (1) is at least one acid sensitive polymer, and wherein (a) is free or essentially free of acid species.

46. The improvement of claim 43 wherein said thermoplastic polymer of (1) is a thermoplastic polyester, and wherein (a) is free or essentially free of acid species.

47. The improvement of claim 46 wherein said at least one melamine compound of (b) used is melamine cyanurate or melamine pyrophosphate, or both.

48. A flame retardant resin composition which is a solidified melt blend of ingredients comprised of:
   A) at least one thermoplastic polymer;
   B) N,N'-piperazinebis(neopentylglycol)phosphoramidate; and
   C) at least one melamine compound which is (i) melamine, (ii) one or more melamine compounds, or (iii) both of (i) and (ii).

49. A composition of claim 48 wherein said thermoplastic polymer of A) is at least one thermoplastic polyester.

50. A composition of claim 49 wherein said at least one melamine compound of C) is melamine cyanurate or melamine pyrophosphate, or both.

51. A composition of claim 49 wherein said thermoplastic polyester of A) consists essentially of a polybutylene terephthalate.

52. A composition of claim 51 wherein said composition has B) and C) in a B):C) weight ratio in the range of 0.5:1 to 2:1.

53. A flame retardant composition which is the derivative product of ingredients comprising:
   A) at least one thermoplastic polymer when said polymer was in a molten state;
   B) N,N'-piperazinebis(neopentylglycol)phosphoramidate; and
   C) at least one melamine compound which is (i) melamine, (ii) one or more melamine compounds, or (iii) both of (i) and (ii).

54. A composition according to claim 53 wherein C) is melamine cyanurate.

55. A composition according to claim 53 wherein C) is melamine pyrophosphate.

56. A composition according to claim 53 wherein said composition is free of any added bromine- or chlorine-containing flame retardant, and is antimony-free.

57. A composition according to claim 56 wherein C) is melamine cyanurate.

58. A composition according to claim 56 wherein C) is melamine pyrophosphate.

59. A composition according to claim 56 wherein B) and C) had an initial B):C) weight ratio in the range of about 0.1:1 to about 5:1.

60. A composition according to claim 56 wherein said at least one thermoplastic polymer consists essentially of at least one acid-sensitive polymer, and wherein B) is free or essentially free of acid species.

61. A composition according to claim 56 wherein said composition contains a reinforcing amount of a reinforcing agent.

62. A composition according to claim 56 wherein said at least one thermoplastic polymer consists essentially of a thermoplastic polyester, and wherein B) is free or essentially free of acid species.

63. A composition according to claim 62 wherein said composition contains a reinforcing amount of a reinforcing agent.

64. A composition according to claim 62 wherein said composition contains a reinforcing amount of glass fiber.

65. A composition according to claim 64 wherein said thermoplastic polyester is a poly(1,4-butylene terephthalate).

66. A composition according to claim 53 wherein said composition further comprises at least one hydrotalcite and any resultant reaction product or products thereof that are present in said composition.

67. A composition according to claim 60 wherein said composition further comprises at least one hydrotalcite and any resultant reaction product or products thereof that are present in said composition.

68. A composition according to claim 67 wherein said composition contains a reinforcing amount of glass fiber.

69. A composition according to claim 68 wherein said thermoplastic polymer is a poly(1,4-butylene terephthalate).

70. A composition according to claim 66 wherein said composition contains a reinforcing amount of a reinforcing agent.

71. A composition according to claim 70 wherein said composition contains a reinforcing amount of glass fiber.

72. A composition according to claim 71 wherein said thermoplastic polyester is a poly(1,4-butylene terephthalate).

73. A composition according to claim 72 wherein C) is melamine cyanurate or melamine pyrophosphate, or both.

* * * * *